US007266804B2

(12) United States Patent
Hogg et al.

(10) Patent No.: US 7,266,804 B2
(45) Date of Patent: Sep. 4, 2007

(54) STRATEGY FOR SELECTIVELY MAKING NON-PUBLIC RESOURCES OF ONE ASSEMBLY VISIBLE TO ANOTHER

(75) Inventors: James H. Hogg, Bellevue, WA (US); Christopher W. Brumme, Mercer Island, WA (US); James S. Miller, Bellevue, WA (US); William G. Evans, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 800 days.

(21) Appl. No.: 10/783,363

(22) Filed: Feb. 20, 2004

(65) Prior Publication Data

US 2005/0188346 A1    Aug. 25, 2005

(51) Int. Cl.
*G06F 9/45* (2006.01)
(52) U.S. Cl. ........................ 717/101; 717/120
(58) Field of Classification Search ................ 717/101, 717/120
See application file for complete search history.

(56) References Cited

U.S. PATENT DOCUMENTS

| 5,381,547 | A | 1/1995 | Flug et al. |
| 5,539,896 | A | 7/1996 | Lisle |
| 5,551,015 | A | 8/1996 | Goettelmann et al. |
| 6,725,335 | B2 | 4/2004 | Bala et al. |
| 7,058,929 | B2 | 6/2006 | Charnell et al. |
| 7,069,549 | B2 | 6/2006 | Charnell et al. |
| 2002/0013938 | A1 | 1/2002 | Duesterwald et al. |
| 2002/0161996 | A1* | 10/2002 | Koved et al. ............... 713/150 |
| 2003/0154239 | A1* | 8/2003 | Davis et al. ............... 709/201 |
| 2005/0021788 | A1* | 1/2005 | Tucker et al. ............... 709/229 |

OTHER PUBLICATIONS

David Platt, "Introducing Microsoft NET," Microsoft Press, Redmond, Washington, 2003, pp. 13-25.
Jesse Liberty, "Programming C#," O-Reilly Publications, Jul. 2001, Chapter 18, also accessible at <http://www.oreilly.com/catalog/progcsharp/chapter/ch18.html>, online pp. 1-7.
NET Framework Developer's Guide, "Strong-Named Assemblies," Microsoft Corporation MSDN Library, accessible at <http://msdn.microsoft.com/library/default.asp?url=/library/en-us/cpguide/html/cpconStrong-NamedAssemblies.asp>, accessed on Dec. 29, 2003, 1 page.
Visual C# Language Concepts, "Building from the Command Line," Microsoft Corporation MSDN Library, accessible at <http://msdn.microsoft.com/library/default.asp?url=/library/en-us/cscomp/html/vcgrfBuildingFromCommandLine.asp>, accessed on Dec. 30, 2003, 2 pages.

(Continued)

*Primary Examiner*—John Chavis
(74) *Attorney, Agent, or Firm*—Lee & Hayes, PLLC

(57) ABSTRACT

A strategy is described for associating an InternalsVisibleTo (IVT) attribute with a non-public resource of a first assembly. The IVT attribute names a second assembly. By virtue of the IVT attribute, during runtime, the non-public resource in the first assembly is made visible to the second assembly. In addition to naming the second assembly, the IVT attribute can include a number of optional arguments, such as arguments which specify the version, culture, and public key token associated with the second assembly.

50 Claims, 7 Drawing Sheets

OTHER PUBLICATIONS

Demien Watkins and Sebastian Lange, "An Overview of Security in the .NET Framework," Microsoft Corporation MSDN Library, accessible at <http://msdn.microsoft.com/library/default.asp?url=/library/en-us/dnnetsec/html/netframesecover.asp>, accessed on Dec. 29, 2003, 16 pages.

James Newkirk and Alexei Vorontsov, "Now .NET's Custom Attributes Affect Design," IEEE Software, vol. 19, No. 5, Sep.-Oct. 2002, pp. 18-20.

Microsoft C++ Language Reference for embedded Visual C++, "Friends," Microsoft Corporation MSDN Library, accessible at <http://msdn.microsoft.com/library/default.asp?url=/library/en-us/dv_vccelng4/html/ellrffriends.asp>, accessed on Dec. 29, 2003, 1 page.

Brent Rector, "Giving a .NET Assembly a Strong Name," available at <http://www.developer.com/net/cplus/article.php/3292231>, accessed on Dec. 31, 2003, 5 pages.

* cited by examiner

STRATEGY FOR SELECTIVELY MAKING NON-PUBLIC RESOURCES OF ONE ASSEMBLY VISIBLE TO ANOTHER

TECHNICAL FIELD

This subject matter relates to a strategy for compiling and executing code units, and, in a more particular implementation, to a strategy for compiling and executing code units in a virtual machine environment.

BACKGROUND

A virtual machine (VM) environment executes programs in a manner which is generally independent of the underlying complexities in the platform used to implement the execution. Microsoft Corporation's .NET Framework (provided by Microsoft Corporation of Redmond, Wash.) provides a virtual machine environment with its Common Language Runtime (CLR) functionality. Sun's Java (provided by Sun Microsystems, Inc. of Santa Clara, Calif.) provides another well known virtual machine environment.

FIG. 1 shows an overview of the operation of an exemplary architecture 100 employed by the .NET Framework in generating and executing code. Broadly stated, the architecture 100 performs a series of actions 102 used to generate intermediate language (IL) code, and another series of actions 104 for loading and executing that intermediate language code in a specific computing platform.

To begin with, source code 106 (such as program "Application.cs") is fed to a compiler 108. The source code can be written in a variety of languages that target the .NET Framework, such as C#, Visual Basic.NET, JScript.NET, C++ with Managed Extensions, and so on. The architecture 100 can use different kinds of compilers depending on the language used to create the source code 106. For instance, FIG. 1 shows the exemplary use of a C# compiler 108 to transform a source program written in C#.

The compiler 108 produces the intermediate language (IL) code and metadata 110. This IL is expressed in a common coding framework regardless of the language that was used to create the original source code 106. Metadata provides descriptive information regarding the IL. In general, the common coding framework provided by the IL and the metadata 110 are specifically tailored to make use of the common resources of the .NET Framework environment, and, in particular, to make use of the CLR. Code that is built to utilize the CLR is referred to as "managed code."

A key feature provided by the CLR is its use of a common set of programming types via a Common Type System (CTS). Generally, a type pertains to rules used to interpret information in the source code. CTS specifies a variety of types, including classes, interfaces, arrays, delegates, etc. A class refers to a collection that can include methods, properties, and events. An interface also refers to a collection that can include methods, properties, and events; interfaces differ from classes in that they specify software contracts, without implementation. An array refers to a collection of values having the same type. A delegate refers to a link to a method. The above-mentioned metadata generated by the compiler 108 provides descriptive information pertaining to these types, such as the name of the type, the identity of any interfaces which the type references, the identity of any methods implemented by the types, and so on. Additional information regarding the basics of the .NET Framework can be found in a number of introductory texts, such as Pratt, *Introducing Microsoft .NET*, Third Edition, Microsoft Press, 2003.

In the execution phase 104, the architecture 100 uses a CLR loader and a just-in-time (JIT) compiler (generally illustrated in FIG. 1 as a "loader/JIT" component 112) to transform the IL and metadata 110 into native code 114. More specifically, the loader/JIT component 112 provides code access security, cross-language integration, debugging, object lifetime management, and so on. The native code 114 constitutes the actual machine code that will run on an execution platform (e.g., a specific computing machine). The compilation process provided by the loader/JIT component 112 is referred to as "just-in-time" because the compilation can take place just prior to the execution of the code.

The architecture 100 performs the above-identified tasks in the context of units of code referred to as "assemblies." An assembly refers to a collection of one or more files that are versioned, security coded, and deployed as a unit. An assembly manifest provides assembly metadata that describes various characteristics of the assembly files, and which effectively ties these assembly files together. One piece of metadata contained within the assembly manifest is an indication of whether the resources contained within the assembly are marked as non-public resources or public resources. Resources of an assembly that are designated as non-public resources are only "visible" to "entities" within the defining assembly, such as by methods contained within the defining assembly. On the other hand, resources of an assembly that are designated as public are visible to entities both within and outside the defining assembly, such as methods provided in another assembly. During execution of an assembly that references another assembly's resources, the loader/JIT component 112 reads the metadata of that other assembly to determine whether these resources are public; if so, then execution can proceed, and if not, execution cannot proceed.

FIG. 2 broadly illustrates the above-described concepts in an exemplary scenario 200. The scenario 200 shows four compiled assemblies, including assembly A 202, assembly B 204, assembly C 206, and assembly D 208. In this exemplary case, assembly A 202 includes public resources 210 that are visible to other assemblies (such as assembly B 204, assembly C 206, and assembly D 208). Assembly A 202 also includes non-public resources 212 that are not visible to other assemblies (e.g., assembly B 204, assembly C 206, and assembly D 208). These public and non-public resources (210, 212) can correspond to classes or other types within assembly A 202. FIG. 2 illustrates the above-identified concepts by showing an arrow without an "X" that points from assemblies B, C, and D (204, 206, 208) to the public resources 210, and an arrow with an "X" that points from assemblies B, C, and D (204, 206, 208) to the non-public resources 212. That is, the arrow without the "X" indicates that visibility is permitted, and the arrow with the "X" indicates that visibility is precluded (or blocked).

By virtue of the above-described designation of resources as public and non-public, the loader/JIT component 112 will not allow any "outside" assembly (such as assembly B 204, assembly C 206, and assembly D 208) to access assembly A 202's non-public resources 212. Thus, designating the resources 212 as non-public serves a security role by preventing other assemblies from tampering with potentially private and sensitive information provided by the assembly A 202.

Nevertheless, there is a price to pay for the above-mentioned security benefits. Namely, some of the outside assemblies may have a legitimate (e.g., non-malicious) need to access the non-public resources 212 of assembly A 202, but the non-public status of these resources 212 prevents these outside assemblies from accessing these resources 212. One way to address this problem is to re-designate the non-public resources 212 as public resources. This opens up the previously non-public resources 212 to all legitimate uses by outside assemblies; however, the public designation is not discriminatory, so that it also accommodates assemblies that wish to access the resources 212 for non-legitimate (e.g., malicious) uses. This can result in a security breach and potential corruption of computer code and database records. Further, even where there is no security risk involved in providing assembly resources to a wider population of outside assemblies, the designer of the assembly may nonetheless wish to restrict the population of interacting assemblies so as to simplify the assembly's design and testing; that is, an assembly may need to adopt a more robust design if it is intended to interact with a wider population of assemblies than originally intended.

Another way to permit an outside assembly to access the non-public resources 212 of assembly A 202 is to redesign that outside assembly such that it actually incorporates all of the resources that its needs from assembly A 202. However, this change is typically a relatively invasive, error prone, and time intensive task, requiring redesign of source code, recompiling, and so on. Also, this solution reduces the modularity and independence of a software product's computer code, which is generally considered a negative consequence in the computing arts.

Accordingly, there is an exemplary need in the art to provide a more efficient way of permitting an entity to selectively gain access to resources in an assembly that have been designated as non-public.

SUMMARY

According to one exemplary implementation, a method is described for forming (e.g., compiling) and executing code units. The method includes a step of forming a first code unit having a resource, and forming a second code unit which references the resource in the first code unit. The first code unit places restrictions on the visibility of the resource to other code units, but the first code unit also includes an attribute which overrides the restrictions with respect to the second code unit. The method also includes a step of executing the first and second code units using a runtime component, involving making the resource of the first code unit visible to the second code unit as instructed by the attribute.

Additional exemplary implementations are also described in the following.

Figure 1:
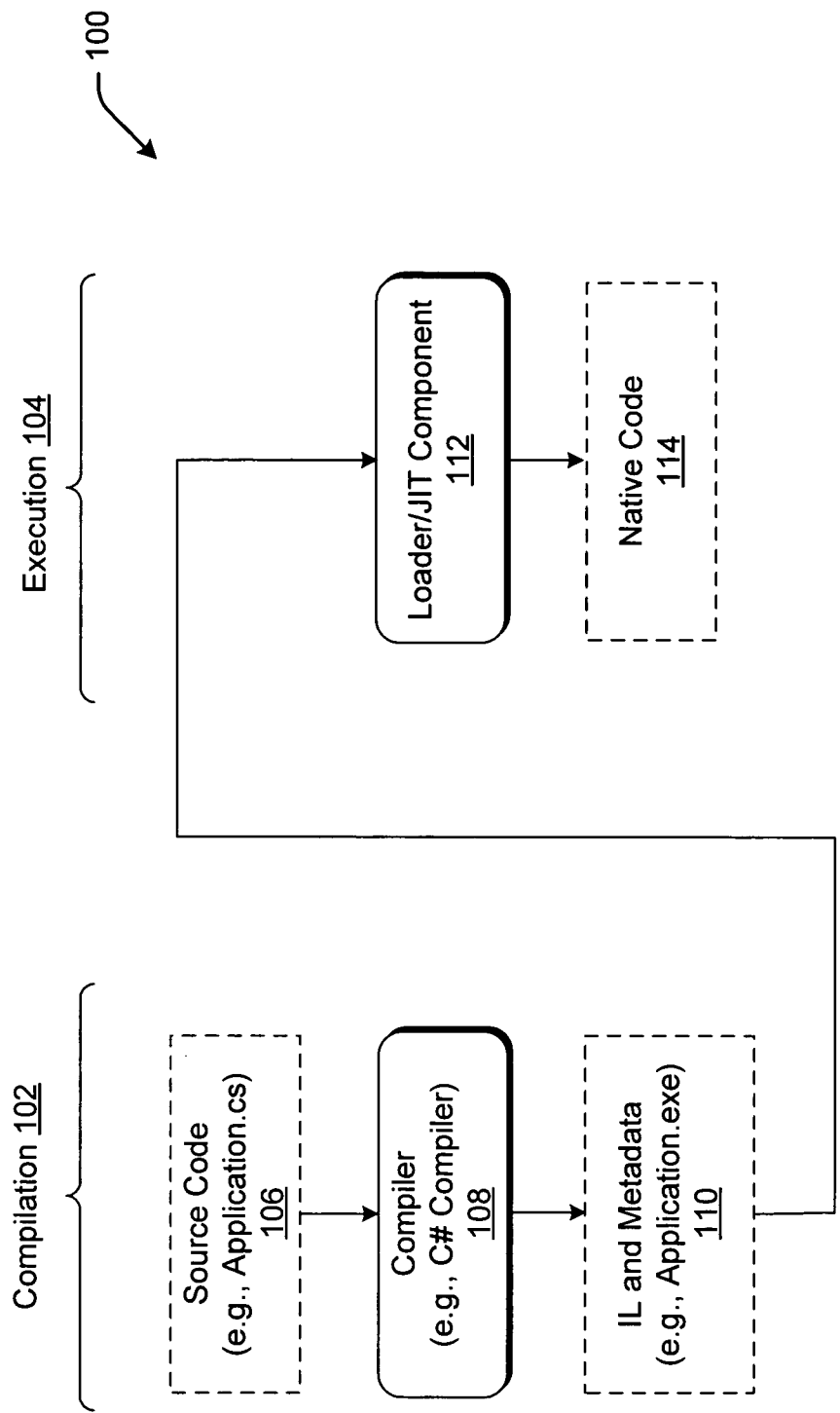
FIG. 1 shows an exemplary .NET Framework architecture.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

Broadly stated, the solution described here involves forming a first code unit having a resource, wherein the first code unit places restrictions on the visibility of the resource to other code units. However, an attribute is added to the first code unit which selectively overrides the restrictions with respect to a second code unit (or additional other specified referencing modules). When the second code unit is executed at runtime, the loader/JIT component makes the resource of the first code unit visible to the second code unit, as instructed by the attribute. As used in this disclosure, the term "code unit" broadly refers to any unit of code in any kind of code environment.

According to one exemplary implementation, the above-mentioned attribute can be implemented as a custom attribute. This custom attribute can be added to the first assembly's metadata as produced by a language compiler. This attribute is referred to herein as an "InternalsVisibleTo" attribute, or an "IVT" attribute for brevity. This label is descriptive of the function performed by this attribute; namely, the InternalsVisibleTo attribute specifies that an internal resource within the first code unit is made "visible to" the second code unit. However, this label is otherwise exemplary and non-limiting.

Another term used in this discussion is that of "visibility-privileged assembly." In the context of this discussion, attaching an IVT attribute, that identifies a second code unit, to a resource in the first code unit renders that second code unit a "visibility-privileged" assembly with respect to the first code unit. Again, this term is descriptive of the characteristics of an assembly that is granted visibility via the IVT attribute, but this term is otherwise exemplary and non-limiting.

In one code environment, making a resource in a first code unit "visible" or "available" to a second code unit does not necessarily mean that the second code unit can utilize this resource, as the first code unit may impose other constraints (to be discussed below) which restrict the second code unit's attempt to utilize or access the resource. However, in another code environment, making a resource in a first code unit "visible" or "available" to a second code unit does mean that the second code unit can utilize this resource. Accordingly, the terms "visible" and "available" should be construed broadly herein. Considered abstractly, a code environment has the capability to impose any kind of restriction that relates to a resource; a resource is made "visible" or "available" (as these terms are broadly used herein) when it removes that restriction with respect to a specified assembly; different technology-dependent code environments can apply this mechanism to different kinds of restrictions. Stated in a different way, the terms "visible" or "available" refer to any characteristic related to a resource which can be restricted, and for which that restriction can be selectively overridden.

The above-summarized technique can be applied in many different programming environments. It can be generally used in any environment that involves one code unit referencing another, including stand-alone computer environments, network environments, and so forth. To facilitate discussion, and to provide concrete examples, this discussion will feature the application of the above-described technique to the type of virtual machine environment illustrated in FIG. 1, and, more specifically, to Microsoft's .NET Framework environment. In connection with this environment, this disclosure will discuss the code units in the specific context of assemblies that contain various resources that conform to the .NET's Common Type System (CTS). Again, however, the techniques described herein can be applied to other programming environments besides the .NET environment in which the term "code units" can take on a different interpretation.

In the following discussion, any of the functions described herein can be implemented using software, firmware (e.g., fixed logic circuitry), manual processing, or a combination of these implementations. The term "logic" as used herein generally represents software, firmware, or a combination of software and firmware. In the case of a software implementation, the logic can represent collections of program code (and/or declarative statements) that perform specified tasks when executed on a processing device or devices (e.g., CPU or CPUs). The program code can be stored in one or more computer readable memory devices.

Finally, a number of examples will be presented in this disclosure in the alternative (e.g., case A or case B). In addition, this disclosure encompasses those cases which combine alternatives in a single implementation (e.g., case A and case B), even though this disclosure may not expressly mention these conjunctive implementations in every occasion.

Section A of this description provides an overview of exemplary characteristics of the visibility-privileged relationship. Section B describes an exemplary system for implementing the visibility-privileged behavior described in Section A. Section C describes an exemplary procedure for building and executing assemblies that are subject to the visibility-privileged relationship. Section D provides additional details regarding the characteristics of the visibility-privileged relationship. And Section E describes an exemplary computer environment for implementing aspects of the procedure discussed in Section C.

A. Overview of Exemplary Characteristics of the Visibility-Privileged Relationship FIG. 3 illustrates the use of the IVT attribute in the context of the scenario introduced in FIG. 2. In the scenario 300 shown in FIG. 3, a language compiler has produced a collection of assemblies, including assembly A 302, assembly B 304, assembly C 306, and assembly D 308. These assemblies are merely exemplary; other scenarios can involve more assemblies or fewer assemblies.

Assembly A 302 has a collection of resources 310 identified as public resources and another collection of resources 312 identified as non-public resources. These resources (310, 312) can pertain to any unit and kind of information that is typically provided in an assembly, including modules in assemblies (for example, modules in assemblies in the .NET code environment), namespaces, types, members, or other information. As in the case of FIG. 2, the public designation of resources 310 means that any outside assembly (such as assembly B 304, assembly C 306, and assembly D 308) can see these public resources 310. The non-public designation of resources 312 means that any outside assembly (such as assembly B 304, assembly C 306, and assembly D 308) cannot normally see these non-public resources 312.

Figure 2:
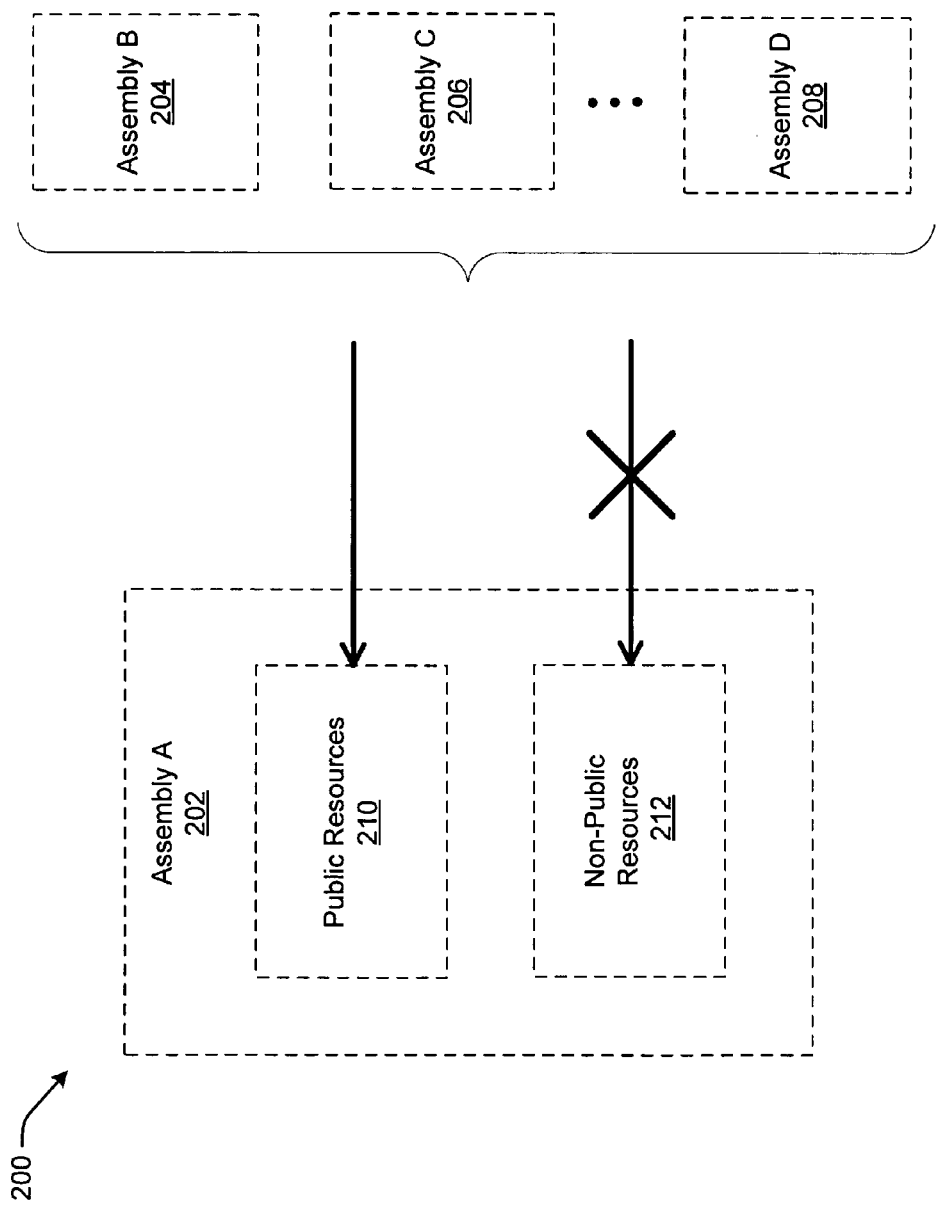
FIG. 2 shows an exemplary assembly having resources designated as public and resources designated as non-public, and also shows the consequences thereof to other assemblies that wish to access the non-public resources.
Figure 3:
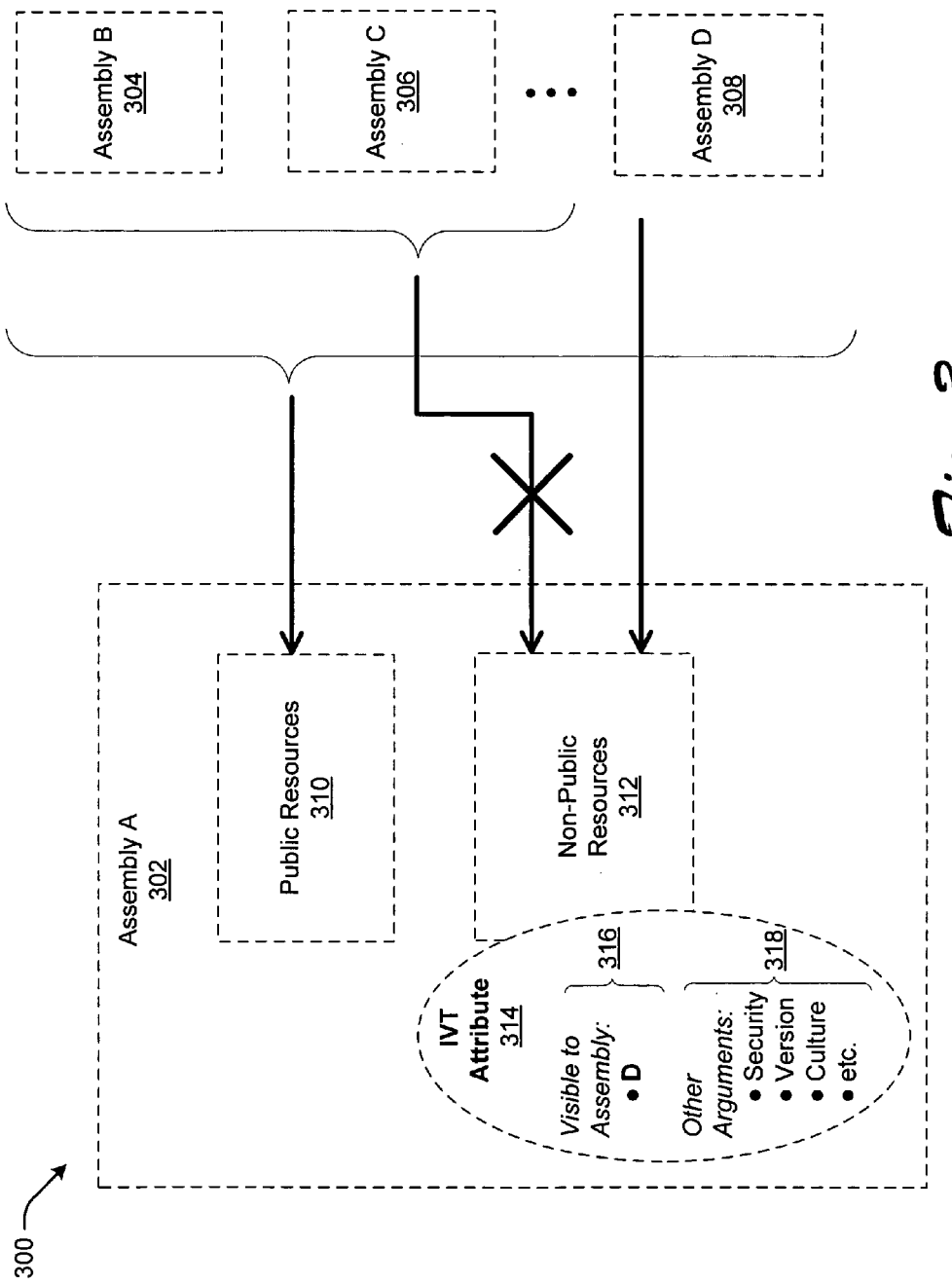
FIG. 3 shows an exemplary assembly having resources designated as public and resources designated as non-public, where an InternalsVisibileTo (IVT) attribute is associated with the non-public resources to designate which outside assembly is allowed to access these non-public resources.

However, unlike the scenario 200 shown in FIG. 2, the scenario 300 in FIG. 3 associates an IVT attribute 314 with the non-public resources 312. This IVT attribute 314 will be interpreted by a loader/JIT component so as to allow a designated outside assembly or assemblies to access the non-public resources 312, while still preventing other assemblies from accessing the non-public resources 312. This satisfies the exemplary needs identified in the Background section of this disclosure; namely, those assemblies that have a legitimate need to see the non-public resources 312 can do so by virtue of the IVT attribute 314, while other assemblies that might not have a legitimate need are prevented from doing so. Note that it is also possible to restrict resource availability by making the resource public to all assemblies, yet restricting this availability by associating a Strong Name Identity Permissions (SNIPs) with it; in contrast, however, the above-described IVT attribute operates by maintaining the non-public status of the resource, but selectively opening up availability to a specific named assembly.

The IVT attribute 314 is shown in the high-level conceptual depiction of FIG. 3 as being "attached" to or associated with the non-public resources 312. Generally, the IVT attribute 314 can be associated with any one or more resources in the assembly A 302. For instance, although not shown, the IVT attribute 314 can be associated with assembly A 302 as a whole, such that it applies to all of the non-public resources contained therein. Alternatively, the IVT attribute 312 can apply to individual resources within the assembly A 302, such as any collection of modules within assembly A 302 (e.g., in the context of the .NET programming environment), any collection of namespaces within assembly A 302, any collection of types within the assembly A 302 (e.g., any class types, array types, pointer types, interface types, enumeration types, and so on), and any collection of members within the types, and so on.

The IVT attribute 314 can be associated with any of the above-described resources by positioning the IVT attribute 314 at an appropriate position within the source code. The language compiler then compiles that source code (with IVT attributes embedded therein) to produce assembly A 302. Alternatively, as will be described below, IVT-related information can also be specified via a command line operation used to invoke the language compiler, so that this IVT-related information does not have to be entirely embedded within the source code itself (or embedded within the source code at all). Further, although FIG. 3 only shows one IVT attribute 314 associated with assembly A 302, this assembly A 302 can include multiple IVT attributes, which may respectively identify plural visibility-privileged assemblies (that is, assemblies that are permitted to see the non-public resources 312 of assembly A 302). In an alternative implementation, a single IVT attribute can specify plurality visibility-privileged assemblies.

Finally, the IVT attribute 314 permits a named outside assembly to "see" the non-public resources 312. This privilege can extend to all requesting entities (e.g., methods)

associated with the named outside assembly. However, in another implementation, the IVT attribute 314 can grant more fine-grained privileges to entities in the named outside assembly, only permitting certain entities within this named outside assembly to view the non-public resources, or only permitting visibility under certain specified conditions. In still further implementations, the IVT attribute 314 can grant visibility to entities on some basis other than a per-assembly basis, e.g., by specifying that visibility is to be granted for certain resource types, and so on. However, to facilitate discussion, the following description is framed in the context of IVT attributes that grant access to entities on a per-assembly basis.

FIG. 3 shows a high level depiction of an exemplary composition of the IVT attribute 314. The IVT attribute 314 includes a first argument 316 that identifies which assembly is designated as a visibility-privileged assembly. In this exemplary case, the first argument 316 identifies the visibility-privileged assembly as assembly D 308. This means that assembly D can "see" the non-public resources 312, whereas other assemblies still cannot see the non-public resources 312. FIG. 3 illustrates this concept by showing an arrow without an "X" between assembly D 308 and the non-public resources 312, and by showing an arrow with an "X" (indicating no visibility) between assemblies B and C (304, 306) and the non-public resources 312. As before, all assemblies (304, 306, and 308) can access the public resources 310 (if they exist within a particular assembly). Further note that, in the case of FIG. 3, the IVT attribute 314 can target individual resources within assembly A 302; in another implementation, however, the IVT attribute 314 can apply globally to all non-public resources within assembly A 302.

The visibility-privileged relationship is one-way (non-symmetric), and non-transitive. More specifically, as stated above, assembly D 308 has visibility into the non-public resources of assembly A 302. This can be represented using the exemplary notation: A<::D. The relationship is one-way, so that D<::A does not hold. To achieve symmetric behavior, assembly D 308 needs to declare assembly A 302 as a visibility-privileged assembly by adding an IVT attribute to assembly D 308. In one exemplary implementation, the relationship is also non-transitive, meaning that, if A<::D and D<::C, then A<::C does not hold. To achieve this relationship, the user can add an IVT attribute to assembly A that grants visibility to assembly C. Finally, the visibility-privileged relationship is reflexive, such that A<::A (meaning that assembly A 302 has visibility into its own resources.)

As indicated in FIG. 3, the IVT attribute 314 also includes a number of other arguments 318. In one implementation, these other arguments 318 are mandatory. In another implementation, one or more of the other arguments 318 may be optional (including, in one case, all of the arguments).

The exemplary other arguments 318 shown in FIG. 3 can include a version argument. The version argument provides a numeric value which identifies the version of the visibility-privileged assembly, in this case, assembly D 308. The version information can be expressed in the format of <major version>.<minor version>.<build number>.<revision>. The other arguments 318 can also include a culture argument. The culture argument provides information regarding the language and regional style employed by the visibility-privileged assembly. For example, the culture argument can specify "de"; this argument specifies that the named assembly must be tailored for user interaction in the German language (for example). The other arguments 318 also include security information. The security information can identify a public key token that is used, or will be used, by the visibility-privileged assembly. Additional information regarding these arguments will be provided in Section D.

The use of the combination of version, culture, and security code (e.g., public key token) is beneficial because it conforms to other referencing schemes (e.g., AssemRefs) used in the .NET Framework. However, these three arguments are otherwise merely exemplary. Other implementations can provide additional arguments, fewer arguments, and/or different arguments.

The IVT attribute 314 as a whole can be expressed using a variety of different syntaxes depending on the developer's programming environment and other factors. Four examples exemplary syntaxes that can be used are listed below:

```
a. [assembly:InternalsVisibleToAttribute("D",
   PublicKeyToken="32ab4ba45e0a69a1")]
b. [assembly:InternalsVisibleToAttribute("D", Version="1.2.3.4",
   Culture="en-US")]
c. [assembly:InternalsVisibleToAttribute("D",
   PublicKeyToken="32ab4ba45e0a69a1", Culture="de")]
d. [assembly:InternalsVisibleToAttribute("D",
   PublicKeyToken="1234abcd56780000", Version="1.2.3.4",
   Culture="fr")]
```

Assume that these attributes have been added to the source code of assembly A 302 to relax the non-public status assigned to the resources 312 (although, as will be discussed, it is possible to convey the same information via a command line mechanism). Case (a) pertains to a situation in which assembly A 302 has granted visibility-privileged status to assembly D 308, provided that that assembly D 308 furnishes the specified public key token of "32ab4ba45e0a69a1." Note that this declaration makes non-public types in the declaring assembly A 302 visible to assembly D 308 for all versions and cultures of assembly D 308 (since the IVT attribute does not specify a version argument or a culture argument). Case (b) pertains to a situation in which assembly A 302 has granted visibility-privileged status to assembly D 308, provided that assembly D 308 furnishes a version of "1.2.3.4" and conforms to a culture of "en-US" (i.e., English, United States). Case (c) pertains to a situation in which assembly A 302 has granted visibility-privileged status to assembly D 308, provided that Assembly D 308 furnishes the specified public key token of "32ab4ba45e0a69a1" and conforms to a culture of "de" (i.e., German). Case (d) pertains to a situation in which assembly A 302 has granted visibility-privileged status to assembly D 308, provided that that assembly D 308 furnishes the specified public key token of "1234abcd56780000," and conforms to a version of "1.2.3.4" and a culture of "fr" (i.e., French).

More specifically, the IVT attribute 314 can be implemented as a custom attribute, which is defined as a class. An exemplary definition of the IVT attribute 314 is specified as follows:

```
[AttributeUsage(AttributeTargets.Assembly, AllowMultiple=True,
Inherited=false)]
    public sealed class InternalsVisibleToAttribute : Attribute {
        private string __name;
        private string __culture
```

-continued

```
    private byte[ ] __publicKeyToken
    private string __version
    public VisibleToAttribute(String assemblyName);
    public string Name { get; set; }
    public string Culture { get; set; }
    public byte[ ] PublicKeyToken { get; set; }
    public string Version { get; set; }
}
```

This custom attribute is added to assembly information produced by the compilation process. This custom attribute can thereafter be interpreted by the loader/JIT component in the runtime execution of assemblies.

B. Exemplary System for Processing Visibility-Privileged Assemblies

Figure 4:
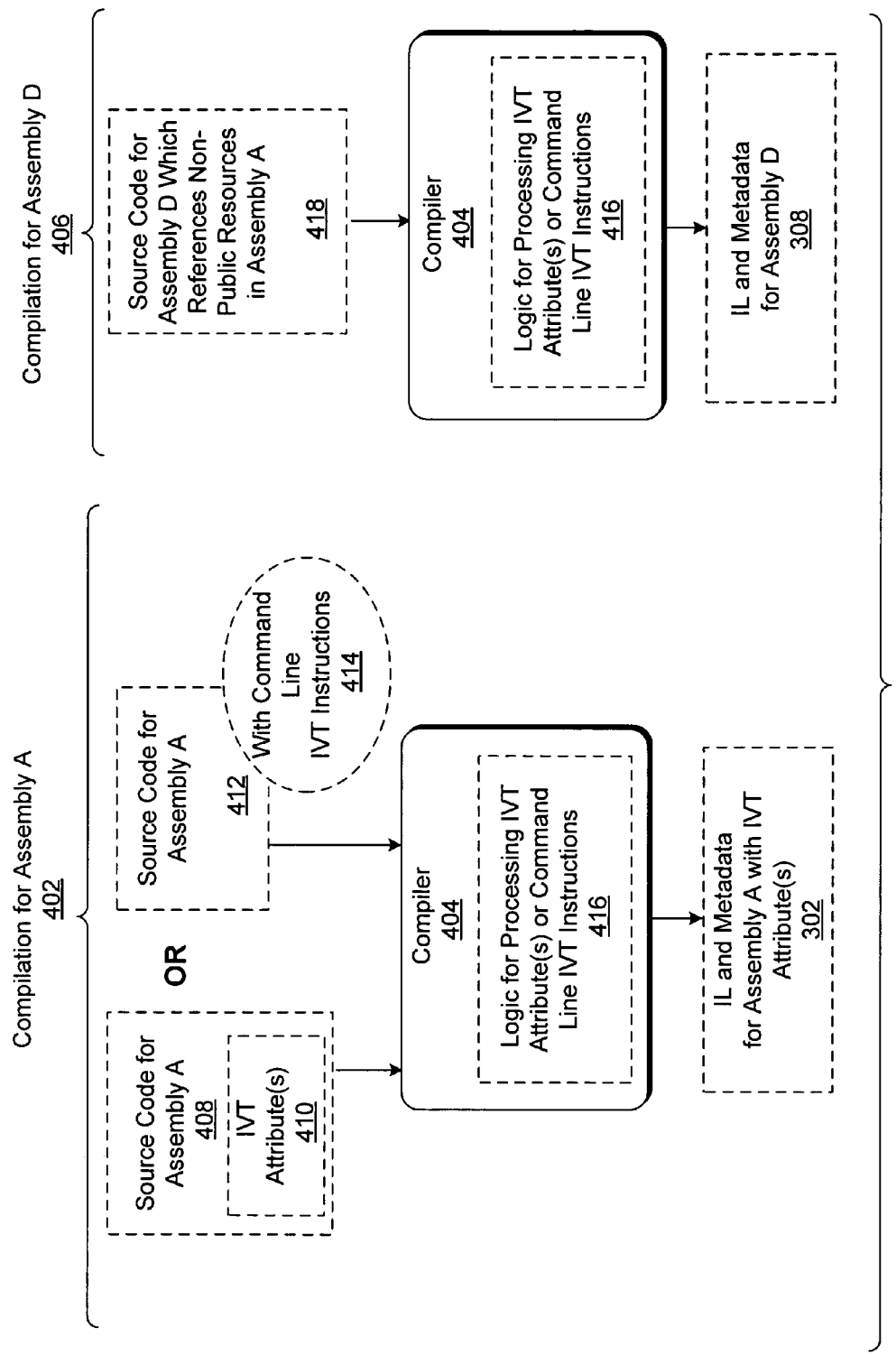
FIG. 4 shows two applications of an exemplary source code compiler used to respectively build two of the assemblies shown in FIG. 3.

FIG. 4 shows architecture for producing exemplary assembly A 302 and assembly D 308 shown in FIG. 3. That is, the left side of FIG. 4 shows a compilation process 402 for compiling source code using a compiler 404 to produce the previously mentioned assembly 302. The right side of FIG. 4 shows a compilation process 406 for compiling source code using the same compiler 404 to produce the previously mentioned assembly 308. In other words, the same compiler 404 is being used to compile the source code for both assemblies A and D (302, 308). Note that FIG. 4 depicts the use of this compiler 404 in two different applications to clarify its operation when it is producing an assembly that includes an IVT attribute (such as assembly A 302) and when it is producing an assembly (such as assembly D 308) which references resources enabled by an IVT attribute in another assembly.

Beginning with the process 402, there are at least two ways to add the IVT attribute to the binary compiled assembly 302 through the use of the compiler 404. The first technique is via the approach described in Section A. Namely, the designer can add one or more IVT attributes to the source code used to produce the assembly A 302. FIG. 4 represents this technique by showing the input of a source code unit 408 having IVT attributes 410 at appropriate locations in the source code. In one implementation, these IVT attributes 410 can be used to govern the visibility of all of the resources (e.g., types) in the assembly A 302. In another implementation, these IVT attributes 410 can be used to govern the visibility of specified resources in the assembly A 302, such as only certain types or members. In the latter case, the designer can associate the IVT attributes 410 with certain resources by positioning these IVT attributes 410 in the source code next to the respective non-public resources that they modify. This implementation is merely exemplary; other approaches can be used to associate the IVT attributes 410 with certain resources depending on the syntactical framework in which a designer seeks to use the visibility-privileged functionality described herein.

In a second technique, a designer can write a source code unit 412 that omits some or all of the IVT attribute information, and then the developer can specify this IVT information 414 in the command line information used to invoke the compiler 404. That is, in one implementation, the source code unit 412 can contain no IVT attributes, or may contain IVT attributes which omit certain arguments, such as the security codes (e.g., public key tokens) of the visibility-privileged assemblies. The user can add this missing information in the command line used to invoke the compiler 404. The compiler 404 receives this information, processes it, and injects the attributes as metadata into the binary assembly that it produces in compilation. Again, different command line syntaxes can be used to express the IVT information depending on the programming environment in which the assembly is being built.

The compiler 404 itself can be implemented as any kind of compiler used to produce managed code, such as a C# compiler, a C++ with Managed Extensions compiler, a Visual Basic.NET compiler, and so on. FIG. 4 generically identifies any functionality configured to process IVT information as logic 416. This logic 416 can represent software and/or firmware for performing the ascribed compilation tasks to be described below. In one implementation, the logic 416 need not employ special provisions for processing the IVT attributes in assembly A 302. This is possible because, in one implementation, the IVT attributes are implemented as custom attributes, which the above-mentioned types of compilers are already designed to handle. In another implementation, the logic 416 can include specifically-tailored functionality for handling the use of IVT attributes in assembly A 302. Further, as will be described below in the context of the discussion of process 406, the logic 416 can include special provisions for processing assembly D 308 which is granted access to the non-public resources in assembly A 302 by virtue of an IVT attribute added to assembly A 302.

The result of the compilation performed by compiler 404 is the production of a binary assembly file (or files), as well as an assembly manifest; together, these files constitute assembly A 302. The assembly A 302 includes intermediate language (IL) code and metadata which reference a number of resources expressed in the Common Type System (CTS). The IVT attributes are embedded within assembly A 302 (e.g., within assembly A 302's metadata). These IVT attributes are interpreted by the loader/JIT component when a customer decides to execute assemblies A and D (302, 308) (to be described below in the context of FIG. 5).

Now referring to the right portion of FIG. 4, the compilation of assembly D 308 involves compiling source code 418 using compiler 404 to produce assembly D 308. In this case, the source code 418 for assembly D does not contain any IVT attributes, unless assembly D, in turn, wishes to expose some or all of its resources to another assembly, such as assembly A 302 (although this possible scenario is not illustrated in FIG. 4 so as not to overly complicate the figure).

In compiling the source code 418, the logic 416 of compiler 404 can be configured to verify that assembly D 308 is indeed allowed to access the non-public resources of assembly A 302. If not, the logic 406 can be configured to generate an error message, thus alerting the developer to this problem before the assemblies are shipped to a customer. Alternatively, the compiler 404 need not perform any checking to determine whether assembly D 308 can in fact access the IVT-enabled non-public resources of assembly A 302. In this latter case, the developer may rely on the loader/JIT component stage of the execution to detect any anomalies that arise in the accessing of the IVT-enabled non-public resources of assembly A 302. In either case, the compiler 404 produces the binary assembly D 308 for shipment to a customer. The assembly D 308 includes intermediate language (IL) code and metadata which reference a number of resources expressed in the Common Type System (CTS). Some of the metadata may include reference information which points to non-public resources in assembly A 302.

Figure 5:
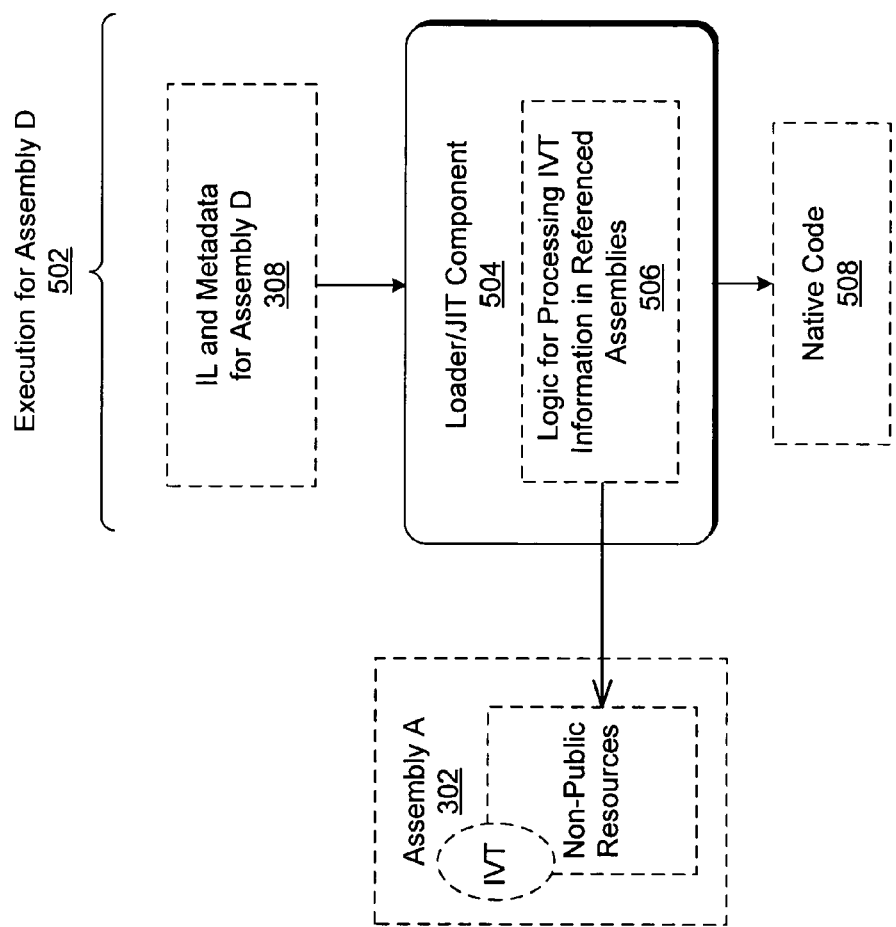
FIG. 5 shows an exemplary loader/JIT component used to execute one of the assemblies shown in FIG. 3.

FIG. 5 shows a process 502 for executing the assembly D 308 that was produced in the process 406 of FIG. 4. The process 502 involves processing assembly D 308 through a loader/JIT component 504. The loader/JIT component 504 includes logic 506 configured to process IVT information in assemblies that are being referenced. In this case, assembly D 308 includes resources which require access to the non-public resources of assembly A 302. Normally, this access would be precluded because non-public resources are earmarked for selective use within their local assembly, e.g., in this case, assembly A 302. However, assembly A 302 includes the IVT attribute 314 that selectively makes the non-public resources available to assembly D 308. The logic 506 can determine the availability of resources in a stepwise fashion by examining each of the possible conditions under which these resources could be made available. For example, the logic 506 can first determine whether the referenced external resources are public. If not, the logic 506 can determine whether the referenced external resources are otherwise made visible by virtue of an IVT attribute. To determine whether a resource is made available by virtue of an IVT attribute in another assembly, the logic 506 can access and examine an in-memory "visibility-privileged assemblies" table that identifies assemblies and resources that have been made available via respective IVT attributes (and which also identifies to what assemblies these resources have been made available). The loader/JIT component 504 generates native code 508 for executing assembly D 308 if all of its resources are determined to be available; otherwise, the loader/JIT component 504 can be configured to produce an error message. The native code 508 is in a form that is tailored for execution on a specific machine/software platform used by the customer.

The above-described techniques for selectively granting access to resources are code language independent. For instance, in one exemplary implementation, the syntax of the IVT attributes is the same regardless of the language used to form the source code units. Also, at runtime, the logic 506 of the loader/JIT component 504 is configured to process assemblies that contain IVT attributes (or that reference other assemblies that contain resources made available by IVT attributes in these other assemblies) in a manner which is independent of the code languages used to form the assemblies. Accordingly, the IVT functionality provides a universal (e.g., generally applicable) technique for selectively granting access to resources in assemblies.

C. Method of Operation

Figure 6:
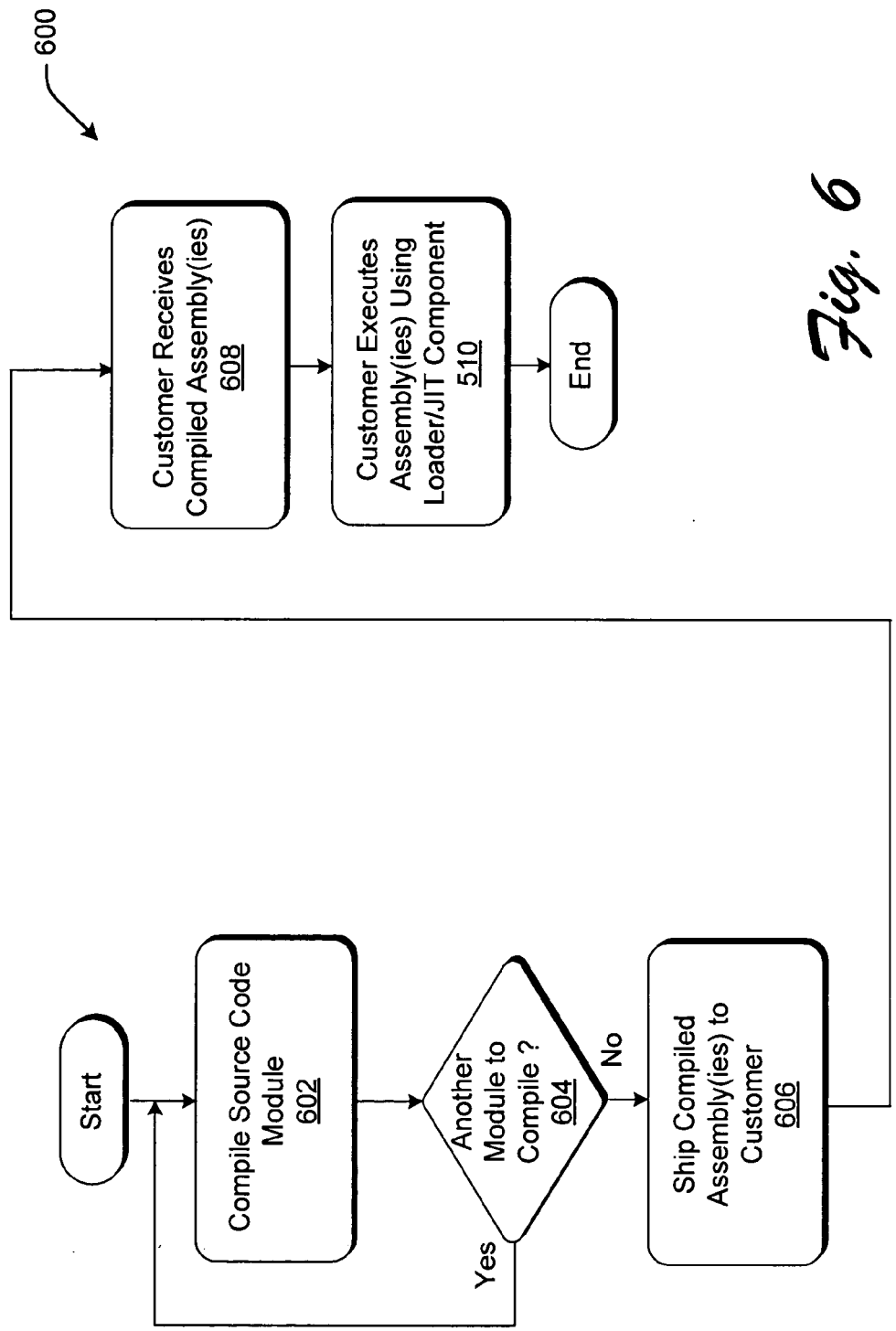
FIG. 6 shows an exemplary procedure for building and executing assemblies using the mechanisms shown in FIGS. 4 and 5.

FIG. 6 shows an exemplary procedure 600 for building and then executing assemblies, where at least one assembly has designated another assembly as a visibility-privileged assembly by virtue of the above-described techniques.

In step 602, a developer compiles source code using any type of compiler that targets the CLR to produce a compiled binary assembly containing intermediate language (IL) code and metadata. The assembly may contain one or more IVT attributes or may include entities (e.g., methods) which reference the non-public resources of another assembly which have been made available via an IVT attribute in that other assembly. Step 604 indicates that this compiling step is repeated for each of the assemblies in a suite of assemblies that form a particular software product or suite of software products. In this compilation, the compiler can be configured to perform checking to ensure that the IVT-enabled resources can be properly accessed; alternatively, the compiler can omit this checking, instead relying on the loader/JIT component to catch any anomalies related to the IVT functionality described herein.

In step 606, the developer ships (or otherwise transfers) the compiled assemblies to a customer. In the context used here, "developer" and "customer" have broad connotation. In the most common case, a developer refers to an entity (e.g., a company) that produces computer code, and a customer can refer to an entity (e.g., an individual or company) that purchases and executes this computer code. However, in one application, the developer can produce code for "in house" use within its own organization.

In step 608, the customer receives the compiled assemblies. In step 610, the customer executes the assemblies using the load/JIT component to produce native code for execution on the customer's computer platform. This final compiling can be performed just prior to running the code (hence the name "just-in-time" compilation). Alternatively, the customer can produce the native code in advance for running at some later point in time. In any event, the loading and runtime compiling of an assembly that references resources IVT-enabled resources in another assembly will utilize the functionality 506 described in the context of FIG. 5. This functionality 506 will alert the user to any errors in referencing IVT-enabled non-public resources.

D. Additional Details Regarding the Visibility-Privileged Relationship

This section provides additional information regarding features of the visibility-privileged relationship. Namely, this section describes details regarding IVT attribute arguments (such as the version and security arguments), details regarding how the IVT attribute affects members defined in an assembly in various circumstances, details regarding how the IVT attribute affects nested members in an assembly, and details regarding how the IVT attribute affects reflection functionality provided in the .NET programming environment.

A.1. The Version Argument

As mentioned above, the IVT attribute can include an optional version argument. The version argument specifies the version of the visibility-privileged assembly that is permitted access to the non-public resources of the visibility-enabling assembly. The inclusion of a version attribute has different implications for the compilation process and the runtime process (corresponding to the processes illustrated in FIGS. 4 and 5, respectively), as will be described below.

As to the compile-time processes shown in FIG. 4, recall that the compiler 404 includes optional logic 416 that is configured to reference non-public resources in another assembly providing that these non-public resources have been rendered visible by virtue of an IVT attribute in that other assembly. The IVT attribute can include the optional version argument. Accordingly, for a particular IVT attribute, the logic 416 determines whether the version of the assembly that it is being processed matches the version of the assembly that is identified by the IVT attribute. The logic 416 can perform this function using different matching paradigms. In one case, the logic 416 demands an exact match before an assembly that is being compiled can gain access to the IVT-enabled non-public resources in another assembly. In another case, the logic 416 can be configured to relax this exact matching requirement. For instance, the logic 416 can ignore one or more fields of the version number, or ignore the version number completely. Alternatively, the IVT attribute itself (specified in the referenced assembly) can express the version number by omitting certain fields or providing wildcards for certain fields to relax the matching criteria. In another case, the logic 416 can use a redirection procedure to relax the exact matching requirement (e.g., where a code unit A grants access to some version D, but at compile time, logic 416 redirects from that version of D to a different one, thus also granting access to that new version).

For example, assume that assembly A 302 includes an IVT attribute that names a specific version of assembly D 308 as its visibility-privileged assembly. For example, assembly A 302 includes the following IVT attribute naming assembly D 308:

[assembly:InternalsVisibleToAttribute("D", Version="v1.0.0.0")]

When building assembly D 308, the compiler 404 will encounter a reference to types defined as non-public in assembly A 302. As mentioned above, the compiler's logic 416 is configured to apply one or more predefined rules that govern the level of exactness that is used in determining whether the actual assembly D 308 satisfies the version argument in the IVT attribute. In one case, the logic 416 requires an exact match, which requires that the assembly D being compiled have precisely version v1.0.0.0. In another case, the logic 416 can apply "fuzzy" matching, such that it will accept any version of assembly D 308 that matches the version criteria v1.0.0.*, or version criteria v1.0.*.*, or version criteria v1.*.*.*, and so on (where the symbol "*" represents a wildcard, e.g., a "don't care" number). Alternatively, the logic 416 can be configured to perform a case-by-case investigation to determine the versions of assembly D 308 that the compiler 404 will accept (e.g., by discovering what BindingRedirects apply at compile time). In still another case, the compiler 404 can be configured to entirely ignore the version number specified in the IVT attribute. In this case, the compiler can be configured to grant visibility if other items in the IVT match, such as assembly name, security code, culture, and so on. In this case, version checking can be deferred until runtime.

As to runtime, the logic 506 used in the loader/JIT component 506 (of FIG. 5) can, like the compiler 404 (of FIG. 4), apply different version matching rules. In one case, the logic 506 can insist on an exact match between the version being processed by the loader/JIT component 504 and the version identified in the IVT attribute. In other cases, the logic 506 permits various types of "fuzzy" matching rules, where the requirement for exact matching is relaxed. In another case, the logic 506 can use a redirection procedure to relax the exact matching requirement based on policy files (e.g., where a code unit A grants access to some version D, but at runtime, logic 506 redirects from that version of D to a different one, thus also granting access to that new version).

For example, assume that assembly D 308 is being compiled which is granted access to non-public resources in assembly A 302 by virtue of the IVT attribute added to assembly A 302 identified above (which specifies version v1.0.0.0). A publisher policy associated with assembly D 308 may state that any reference to versions v1.0.0.0 through v1.1.99.99 should be redirected to version 1.2.0.0. This can be implemented by the following Extensible Markup Language (XML) statements:

<assemblyIdentity name="D" publicKeyToken="32ab4ba45e0a69a1" />
<bindingRedirect oldVersion="1.0.0.0-1.1.99.99" newVersion="1.2.0.0" />

In this case, at runtime, the loader/JIT component 504 loads and makes a reference to a non-public type in assembly A 302. Then, the loader/JIT component 504 notes the version of assembly D 308 from which this particular reference is being made and determines whether assembly A 302's IVT attribute-specified version of assembly D 308 (i.e., version "v1.0.0.0") is being redirected to the requesting version of assembly D. If this is the case, then the visibility check succeeds. For example, in the BindingRedirect example above, a reference from assembly D version "1.2.0.0" would succeed, because it is defined as a substitutable visibility-privileged assembly for assembly A 302's original declared visibility-privileged assembly version "v1.0.0.0."

A.2. The Security-Related Argument

As noted above, an assembly can be identified in an IVT attribute by specifying its name, as well as any combination of the optional parameters of version, culture, and security code (or perhaps none of these optional parameters). Various security codes and corresponding mechanisms can be employed depending on the requirements of a particular application; some security codes may be more secure (e.g., more robust or stronger) than others. For example, the security code can be implemented as a public key token of any size, a full public key, or some other way of ensuring identity. A named assembly that is accompanied by a security code that ensures identity is referred to as a "strong-named" assembly. Alternatively, the security code can be implemented as any kind of "loose" matching mechanism that provides some security assurances but cannot guarantee identity.

More specifically, in one exemplary implementation, the security code can be implemented as a public key token (e.g., PublicKeyToken in the .NET programming environment) that is formed as an 8-byte or 16-byte cryptographically strong hash of a full 160-byte public key (or any other byte-size hash).

In one implementation, the developer can specify the public key token by discovering the public key token of the visibility-privileged assembly, and then typing this public key token as an argument of an IVT attribute within the source code that will produce the assembly. For example, assuming that the public key token is "32ab4ba45e0a69a1," then the developer can form the following IVT attribute at an appropriate location within the assembly:

[assembly:VisibleToAttribute("D", PublicKeyToken="32ab4ba45e0a69a1")]

Alternatively, the developer can specify IVT attributes within the source code which lack one or more arguments, such as the public key tokens. In this case, the IVT attribute would appear as follows in the source code:

[assembly:VisibleToAttribute("D")]

The missing public key token can be supplied via the command line as follows:

csc MyApp.cs /keyfile:D:bpub

This command line information directs the compiler 404 to look in keyfile "bpub" to find the public key token that assembly D contains (or, at least, will contain, after it is eventually built).

A.3. Effect of the IVT Attribute on Type Members

Again assume that an IVT attribute is provided in a compiland that becomes part of an assembly called A 302, and that this IVT attribute designates assembly D 308 as a visibility-accessible assembly (that is, A<::D). This declaration means that assembly A 302's types are visible to assembly D 308. Thus, whilst compiling any file that goes to make up assembly D, the compiler will regard all types defined within assembly A as visible. In particular, all "top level" types declared in assembly A 302 become visible (where the public types were already visible to all assemblies by default; hence, the IVT attribute effectively augments the public types by adding the non-public types for visibility-privileged assembly D 308). However, even though a type is visible to a piece of code, its members are not necessarily accessible (in one exemplary impelementation). (Here, "members" refers to any field, property, event, or method of the type.) More specifically, in one implementation, various accessibility rules may restrict the accessibility of members that are nonetheless rendered visible by an IVT attribute.

For example, consider the following class "Foo" identified in Example 1, expressed in both pseudo CLR code and corresponding exemplary C# code:

EXAMPLE 1

Type Member Accessibility

| Pseudo-code, using CLR names | | C# code, where applicable | |
|---|---|---|---|
| non-public class Foo | | class Foo { // default = internal | |
| PrivateScope | a | // not expressible | in C# |
| Private | b | private | int b; |
| FamANDAssem | c | // not expressible | in C# |
| Assem | d | internal | int d; |
| Family | e | protected | int e; |
| FamORAssem | f | protected internal | int f; |
| Public | g | public | int g; |
| Endclass | | } | |

The terms "PrivateScope," "Private," "FamANDAssem," "Assem," "Family," and "FamORAssem" refer to different accessibility rules applicable to the exemplary environment of .NET Framework members or other code environment members. Namely, the term "PrivateScope" effectively means that the member is visible within a module (subject to various technology-dependent qualifications). The term "Private" specifies that the member is accessible only from within the same type as the member or within a nested type. The term "Family" specifies that the member is accessible from within the same type as the member and from derived types that inherit form it. The term "Assem" specifies that the member is accessible only in the assembly in which the type is defined. The term FamANDAssem" means that the member is accessible only from types that qualify for both family and assembly access. The term "FamORAssem" means that the assembly is accessible only from types that qualify for either family or assembly access. And the term "Public" means that the type is accessible from any type.

For the example specified above, even though an IVT attribute may have specified that the class Foo is visible to the assembly D 308, assembly D 308 cannot access members "a" or "b" (because these members are designated as private). In other words, the visibility-privilege relationship does not override the private designation on members.

As to member c, code within sub-classes of Foo, in assembly D 308, can access this member. In effect, the visibility-privileged relationship has widened "Assem" to span assembly D 308. Normally, it is not possible to define sub-classes of Foo outside its defining assembly; but the visibility-privileged relationship allows a developer to do so within assembly D 308.

As to member d, all code in assembly D 308 can access this member. In effect, the visibility-privileged relationship has widened "Assem" to span assembly D 308.

As to member e, code within sub-classes of Foo, in assembly D 308, can access this member. That is, there is no change due to the visibility-privileged relationship.

As to member f, all code in assembly D 308 can access this member. In effect, the visibility-privileged relationship has widened "Assem" to span assembly D 308.

As to member g, all code within assembly D 308 can access this member. That is, there is no change due to visibility-privileged relationship.

Generally, note that any CLR accessibility that includes "Assem" is affected by the visibility-privileged relationship. In effect, the definition of "assembly" accessibility is widened to include the visibility-privileged assembly (but strictly in the one-way sense of applying to type members defined in assembly A 302). Similarly, the "family" accessibility becomes widened to visibility-privileged assemblies too. More specifically, for static members, the general rule is that a family member can be accessed by code within the type that defines that member, or in any sub-type; for the case of instance members, the rule is that family members can be accessed by code in a sub-type so long as this access is performed via an object reference that is of that caller's sub-type (or one of its sub-types).

A.4. The Case of Nested Types

The above analysis applies to so-called "top-level" member types (that is, non-nested member types). In the case of non-top-level (i.e., nested) member types, their accessibility can be narrowed by the accessibility of their enclosing type. For example, consider the following example in which a class X encloses a subclass XX, which, in turn, encloses another subclass XXX. Further assume that the outer enclosing class X is designed as non-public, but has otherwise been rendered visible to assembly D 308.

EXAMPLE 2

Nested Member Type Accessibility

| Pseudo-code, using CLR names | C# code, where applicable |
|---|---|
| non-public class X | class X { // |
|   public class XX |   public class XX { |
|     Family class XXX |     protected class XXX { |
|       Public e |       public int e; |
|     endclass |     } |
|   endclass |   } |
| endclass | } |

In this case, the field "e" within subclass XXX is public. But this field's containing class, XXX, has "Family" accessibility within its enclosing class, XX. So, the only code that can access field "e" is code within class XXX itself, or in a class derived from XX.

However, there is an additional complication that confronts compilers in the above example. If there is only one compiland that goes to make up assembly D 308, then the compiler 404 has no difficulty performing the tasks described above, that is, in checking whether assembly D 408 can access types in assembly A 302. However, if the compiler 404 is compiling separate files that eventually merge into the same assembly, it may lack sufficient information for performing this merging task. Assume, for example, that the compiler 404 is separately compiling three files labeled D1, D2 and D3 into separate modules. At compilation, the compiler 404 may not know what assembly they will become bound to. In one implementation, this problem can be addressed by defining a new custom attribute, the "PartOfAssembly" attribute (again, this attribute name is descriptive of its function, but this term is otherwise exemplary and non-limiting). A developer can add this attribute into each compiland to provide the required reference information. For example, this attribute can be expressed using the exemplary syntax of:

[module:PartOfAssemblyAttribute("D")]

This attribute specifies that the module that receives this attribute is a part of assembly D 308.

Alternatively, the "part of" reference information can be supplied via the command line in the manner discussed above. For example, the following command line information can be used to instruct the compiler 404 that modules D1, D2, and D3 should be compiled into assembly D 308.

csc /target:module /assembly:D D1.cs
csc /target:module /assembly:D D2.cs
csc /target:module /assembly:D D3.cs (In the specific context of a .NET programming environment, reference to the eventual "home" assembly should be preserved into that copy of the .netmodule, so that ALink can check that the developer is not including the module into a different, non-visibility-privileged assembly; otherwise, this might represent a security risk.)

A.5 Impact on Reflection

A reflection operation allows a program to interact with metadata associated with an assembly, such as during runtime. For instance, the reflection operation can be used to view metadata, discover types, and so on. A reflection emit procedure enables the creation of new types during runtime in a dynamic fashion.

In one implementation, the reflection functionality is not modified to accommodate the inclusion of IVT functionality. That is, a developer can continue to successfully query whether a type is public or non-public, but, in this exemplary implementation, the developer cannot query whether a type is visible from another type by virtue of an IVT attribute; however, in another implementation, logic can be provided to accommodate this supplemental querying function. In any case, reflection can be used to enumerate any IVT attributes within any assembly.

In one implementation, no changes are made to reflection emit to support visibility-privileged assemblies. A user can use current reflection emit methods to build a custom attribute to denote any required visibility-privileged relationship.

E. Exemplary Computer Environment

Figure 7:
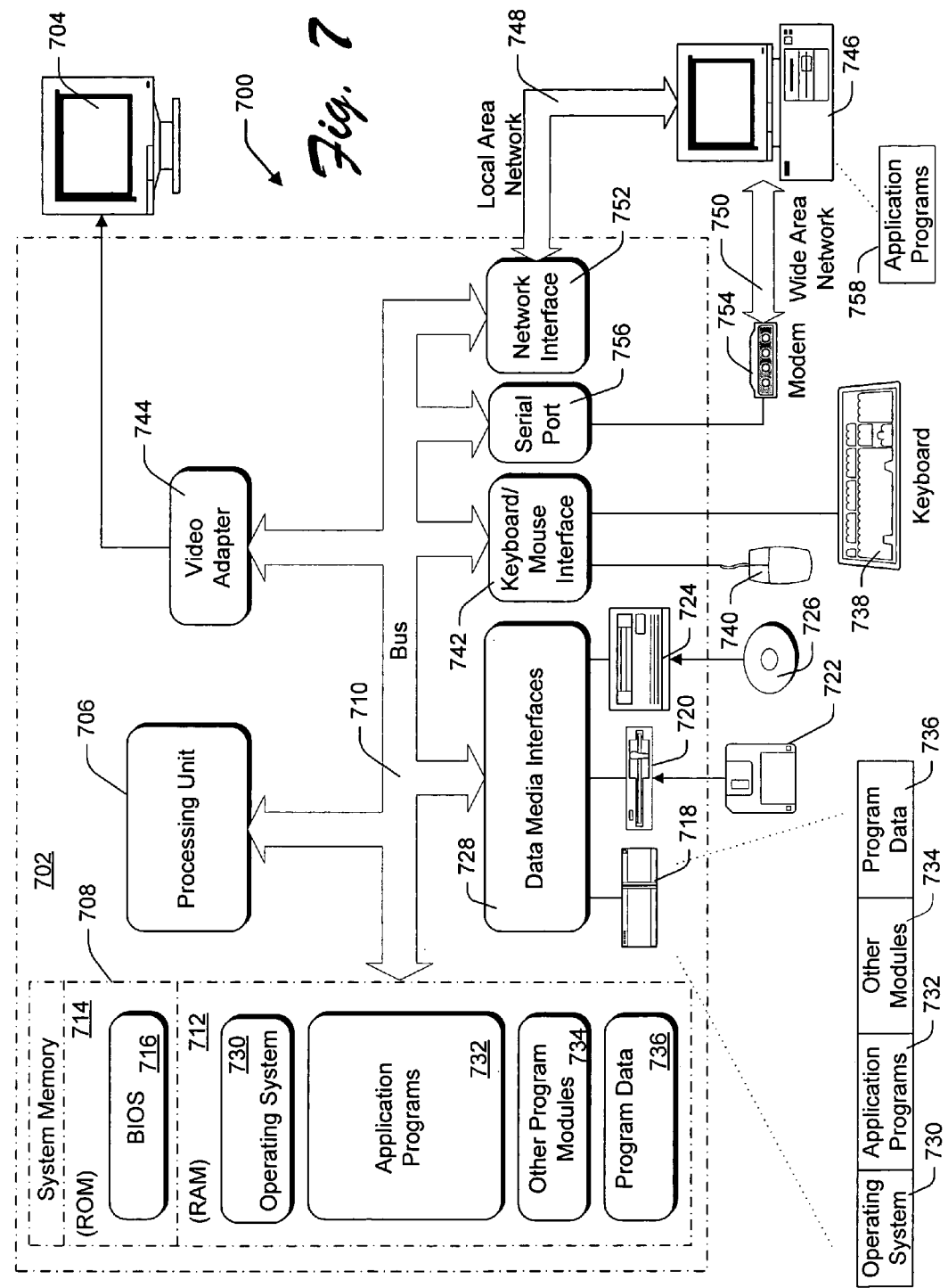
FIG. 7 shows an exemplary computing environment for implementing aspects of the architecture shown in FIGS. 4 and/or 5.

FIG. 7 provides information regarding a computer environment 700 that can be used to implement any of the processing functions described in the proceeding sections, such as various compilation operations provided by the source code compiler 404 (of FIG. 4) and/or various execution operations provided by the loader/JIT component 504 (of FIG. 5).

The computing environment 700 includes the general purpose computer 702 and the display device 704 discussed in the context of FIG. 1. However, the computing environment 700 can include other kinds of computer and network architectures. For example, although not shown, the computer environment 700 can include hand-held or laptop devices, set top boxes, programmable consumer electronics, mainframe computers, gaming consoles, etc. Further, FIG. 7 shows elements of the computer environment 700 grouped together to facilitate discussion. However, the computing environment 700 can employ a distributed processing configuration. In a distributed computing environment, computing resources can be physically dispersed throughout the environment.

Exemplary computer 702 includes one or more processors or processing units 706, a system memory 708, and a bus 710. The bus 710 connects various system components together. For instance, the bus 710 connects the processor 706 to the system memory 708. The bus 710 can be implemented using any kind of bus structure or combination of bus structures, including a memory bus or memory controller, a peripheral bus, an accelerated graphics port, and a processor or local bus using any of a variety of bus architectures. For example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 702 can also include a variety of computer readable media, including a variety of types of volatile and non-volatile media, each of which can be removable or non-removable. For example, system memory 708 includes computer readable media in the form of volatile memory, such as random access memory (RAM) 712, and non-volatile memory, such as read only memory (ROM) 714. ROM 714 includes an input/output system (BIOS) 716 that contains the basic routines that help to transfer information between elements within computer 702, such as during start-up. RAM 712 typically contains data and/or program modules in a form that can be quickly accessed by processing unit 706.

Other kinds of computer storage media include a hard disk drive 718 for reading from and writing to a non-removable, non-volatile magnetic media, a magnetic disk drive 720 for reading from and writing to a removable, non-volatile magnetic disk 722 (e.g., a "floppy disk"), and an optical disk drive 724 for reading from and/or writing to a removable, non-volatile optical disk 726 such as a CD-ROM, DVD-ROM, or other optical media. The hard disk drive 718, magnetic disk drive 720, and optical disk drive 724 are each connected to the system bus 710 by one or more data media interfaces 728. Alternatively, the hard disk drive 718, magnetic disk drive 720, and optical disk drive 724 can be connected to the system bus 710 by a SCSI interface (not shown), or other coupling mechanism. Although not shown, the computer 702 can include other types of computer readable media, such as magnetic cassettes or other magnetic storage devices, flash memory cards, CD-ROM, digital versatile disks (DVD) or other optical storage, electrically erasable programmable read-only memory (EEPROM), etc.

Generally, the above-identified computer readable media provide non-volatile storage of computer readable instructions, data structures, program modules, and other data for use by computer 702. For instance, the readable media can store the operating system 730, one or more application programs 732, other program modules 734, and program data 736.

The computer environment 700 can include a variety of input devices. For instance, the computer environment 700 includes the keyboard 738 and a pointing device 740 (e.g., a "mouse") for entering commands and information into computer 702. The computer environment 700 can include other input devices (not illustrated), such as a microphone, joystick, game pad, satellite dish, serial port, scanner, card reading devices, digital or video camera, etc. Input/output interfaces 742 couple the input devices to the processing unit 706. More generally, input devices can be coupled to the computer 702 through any kind of interface and bus structures, such as a parallel port, serial port, game port, universal serial bus (USB) port, etc.

The computer environment 700 also includes the display device 704. A video adapter 744 couples the display device 704 to the bus 710. In addition to the display device 704, the computer environment 700 can include other output peripheral devices, such as speakers (not shown), a printer (not shown), etc.

Computer 702 can operate in a networked environment using logical connections to one or more remote computers, such as a remote computing device 746. The remote computing device 746 can comprise any kind of computer equipment, including a general purpose personal computer, portable computer, a server, a router, a network computer, a peer device or other common network node, etc. Remote computing device 746 can include all of the features discussed above with respect to computer 702, or some subset thereof.

Any type of network can be used to couple the computer 702 with remote computing device 746, such as a local area network (LAN) 748, or a wide area network (WAN) 750 (such as the Internet). When implemented in a LAN networking environment, the computer 702 connects to local network 748 via a network interface or adapter 752. When implemented in a WAN networking environment, the computer 702 can connect to the WAN 750 via a modem 754 or other connection strategy. The modem 754 can be located internal or external to computer 702, and can be connected to the bus 710 via serial I/O interfaces 756 or other appropriate coupling mechanism. Although not illustrated, the computing environment 700 can provide wireless communication functionality for connecting computer 702 with remote computing device 746 (e.g., via modulated radio signals, modulated infrared signals, etc.).

In a networked environment, the computer 702 can draw from program modules stored in a remote memory storage device 758. Generally, the depiction of program modules as discrete blocks in FIG. 7 serves only to facilitate discussion; in actuality, the programs modules can be distributed over the computing environment 700, and this distribution can change in a dynamic fashion as the modules are executed by the processing unit 706.

Wherever physically stored, one or more memory modules 708, 722, 726, 758, etc. can be provided to store the compilation operations described in FIG. 4 and/or the loader/JIT operations described in FIG. 5.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method for forming and executing code units, comprising:
forming a first code unit having a resource, wherein the first code unit places restrictions on the visibility of the resource to other code units, and wherein the first code unit includes an attribute which overrides the restrictions with respect to a second code unit;
forming the second code unit; and
executing the first and second code units using a runtime component, involving making the resource of the first code unit visible to the second code unit as instructed by the attribute,
wherein the executing comprises using the attribute to determine, at runtime, whether the second code unit has permission to view the resource of the first code unit.

2. The method of claim 1, wherein the attribute that overrides the restrictions comprises a custom attribute added to the first code unit.

3. The method of claim 1, wherein the attribute identifies a name of the second code unit.

4. The method of claim 1, wherein the attribute identifies a security code associated with the second code unit.

5. The method of claim 4, wherein the security code is a public key token.

6. The method of claim 1, wherein the attribute identifies a version of the second code unit.

7. The method of claim 6, wherein the forming of the second code unit and/or the executing applies fuzzy matching to determine whether a version of the second code unit that is being processed matches the version identified in the attribute of the first code unit, the fuzzy matching permitting similar versions to constitute a match that are not exactly the same.

8. The method of claim 1, wherein the attribute identifies culture information associated with the second code unit.

9. The method of claim 1, wherein the forming of the first code unit includes compiling source code that includes the attribute contained therein.

10. The method of claim 1, wherein the forming of the first code unit includes specifying at least some information associated with the attribute via a command line operation.

11. The method of claim 1, wherein the attribute applies to the entire first code unit, making all restricted resources in the first code unit available to the second code unit.

12. The method of claim 1, wherein the attribute applies locally to the resource.

13. The method of claim 1, wherein the resource is one of: an assembly, a module within an assembly, a type, and a member.

14. The method of claim 1, wherein the forming of the second code unit involves ensuring that the second code unit can view the resource.

15. The method of claim 1, wherein the forming of the second code unit does not involve ensuring that the second code unit can view the resource.

16. The method of claim 1, wherein the first and second code units are formed as managed code that targets a virtual machine processing environment.

17. The method of claim 16, wherein the first and second code units are formed to exploit Common Language Runtime functionality provided by a .NET framework.

18. The method of claim 1, wherein the first and second code units can be formed using any one of multiple different code languages, and the determination of whether the second code unit has permission to view the resource of the first code unit is performed at runtime in a manner which is independent of the code language used.

19. A computer readable medium including machine readable instructions for implementing each of the forming of the first code unit, forming of the second code unit, and executing of the first and second code units of claim 1.

20. A method for executing code units, comprising:
receiving first and second compiled code units, wherein the first code unit places restrictions on the visibility of a resource in the first code unit to other code units, and wherein the first code unit includes an attribute which overrides the restrictions with respect to the second code unit;

using the attribute to determine, at runtime, whether the second code unit has permission to view the resource of the first code unit; and if it is determined that the second code unit has permission to view the resource of the first code unit, then proceeding with the execution of the second code unit.

21. The method of claim 20, wherein the attribute also identifies a security code associated with the second code unit, and wherein the determining further comprises determining whether a security code associated with the second code unit matches the security code identified by the attribute, and the proceeding with the execution is performed only on condition of a match.

22. The method of claim 20, wherein the first and second code units can be formed using any one of multiple different code languages, and the determination of whether the second code unit has permission to view the resource of the first code unit is performed at runtime in a manner which is independent of the code language used.

23. A computer readable medium including machine readable instructions for implementing each of the receiving, determining, and proceeding of claim 20.

24. A system including a processor for forming and executing code units, comprising: a language compiler configured to: form a first code unit having a resource, wherein the first code unit places restrictions on the visibility of the resource to other code units, and wherein the first code unit includes an attribute which overrides the restrictions with respect to a second code unit; and form the second code unit; and a runtime component configured to execute the first and second code units using a runtime compiler, involving making the resource of the first code unit visible to the second code unit as instructed by the attribute, wherein the runtime component is configured to use the attribute to determine, at runtime, whether the second code unit has permission to view the resource of the first code unit.

25. The system of claim 24, wherein the attribute that overrides the restrictions comprises a custom attribute added to the first code unit.

26. The system of claim 24, wherein the attribute identifies a name of the second code unit.

27. The system of claim 24, wherein the attribute identifies a security code associated with the second code unit.

28. The system of claim 27, wherein the security code is a public key token.

29. The system of claim 24, wherein the attribute identifies a version of the second code unit.

30. The system of claim 29, wherein the language compiler and/or the runtime component is configured to apply fuzzy matching to determine whether a version of the second code unit that is being processed matches the version identified in the attribute of the first code unit, the fuzzy matching permitting similar versions to constitute a match that are not exactly the same.

31. The system of claim 24, wherein the attribute identifies culture information associated with the second code unit.

32. The system of claim 24, wherein the language compiler is configured to form the first code unit by compiling source code that includes the attribute contained therein.

33. The system of claim 24, wherein the language compiler is configured to form the first code unit by specifying at least some information associated with the attribute via a command line operation.

34. The system of claim 24, wherein the attribute applies to the entire first code unit, making all restricted resources in the first code unit available to the second code unit.

35. The system of claim 24, wherein the attribute applies locally to the resource.

36. The system of claim 24, wherein the resource is one of: an assembly, a module within an assembly, a type, and a member.

37. The system of claim 24, wherein the language compiler is configured to form the second code unit by ensuring that the second code unit can view the resource.

38. The system of claim 24, wherein the language compiler is configured to form of the second code unit by not ensuring that the second code unit can view the resource.

39. The system of claim 24, wherein the first and second code units are formed as managed code that targets a virtual machine processing environment.

40. The system of claim 39, wherein the first and second code units are formed to exploit a Common Language Runtime provided by a .NET Framework.

41. The system of claim 24, wherein the first and second code units can be formed using any one of multiple different code languages, and wherein the runtime component is configured to use the attribute to determine whether the second code unit has permission to view the resource of the first code unit in a manner which is independent of the code language used.

42. A computer readable medium including machine readable instructions for implementing each of the language compiler and the runtime component of claim 24.

43. A processor implementing runtime component for executing code units, comprising: logic configured to receive first and second compiled code units, wherein the first code unit places restrictions on the visibility of a resource in the first code unit to other code units, and wherein the first code unit includes an attribute which overrides the restrictions with respect to the second code unit; logic configured to use the attribute to determine whether the second code unit has permission to view the resource of the first code unit; and logic configured to proceed with the execution of the second code unit if it is determined that the second code unit has permission to view the resource of the first code unit.

44. The runtime component of claim 43, wherein the attribute also identifies a security code associated with the second code unit, and wherein the logic for determining is further configured to determine whether a security code associated with the second code unit matches the security code identified by the attribute, and the logic for proceeding with the execution is configured to execute the second code unit only on condition of a match.

45. The runtime component of claim 43, wherein the first and second code units can be formed using any one of multiple different code languages, and wherein the logic configured to determine whether the second code unit has permission to view the resource of the first code unit is configured to perform the determination in a manner which is independent of the code language used.

46. A computer readable medium including machine readable instructions for implementing the logic for receiving, logic for determining, and logic for proceeding of claim 43.

47. A method for compiling code units, comprising:

forming a first code unit having a resource, wherein the first code unit places restrictions on the visibility of the resource to other code units, and wherein the first code unit includes an attribute which overrides the restrictions with respect to a second code unit; and forming the second code unit, including ensuring that the second code unit can view the resource in the first code unit, wherein the attribute is interpretable at runtime to selectively permit the second code unit to access the resource in the first code unit, and wherein the interpretation of the attribute is performed in a manner which is independent of a code language used to form the first code unit and the second code unit.

48. A computer readable medium including machine readable instructions for implementing each of the forming of the first code unit, and forming of the second code unit of claim 47.

49. A processor implementing a language compiler for forming code units, comprising: logic configured to: form a first code unit having a resource, wherein the first code unit places restrictions on the visibility of the resource to other code units, and wherein the first code unit includes an attribute which overrides the restrictions with respect to a second code unit, and; and form the second code unit, wherein the logic is further configured to ensure that the second code unit can view the resource in the first code unit when it forms the second code unit, further wherein the attribute is interpretable at runtime to selectively permit the second code unit to access the resource in the first code unit, and wherein the interpretation of the attribute is performed in a manner which is independent of a code language used to form the first code unit and the second code unit.

50. A computer readable medium including machine readable instructions for implementing the logic of claim 49.

* * * * *